United States Patent [19]
Morrison et al.

[11] 3,983,555
[45] Sept. 28, 1976

[54] RADAR RECEIVERS

[75] Inventors: John Malcolm Morrison; Charles McGregor Stewart, both of Edinburgh, Scotland

[73] Assignee: Ferranti, Limited, Hollinwood, England

[22] Filed: July 12, 1974

[21] Appl. No.: 488,179

[30] Foreign Application Priority Data
July 14, 1973 United Kingdom............... 33647/73

[52] U.S. Cl..................................... 343/5 R; 325/17
[51] Int. Cl.²....................... G01S 9/02; H04B 1/40
[58] Field of Search ............ 343/5 AF, 5 R; 325/17

[56] References Cited
UNITED STATES PATENTS

| | | | |
|---|---|---|---|
| 3,128,462 | 4/1964 | Woolfson.......................... | 343/5 AF |
| 3,372,391 | 3/1968 | Lerner.............................. | 343/5 AF |
| 3,374,480 | 3/1968 | Russell et al. .................... | 343/5 AF |
| 3,417,396 | 12/1968 | Stifter et al....................... | 343/5 AF |
| 3,569,965 | 3/1971 | Bagley.............................. | 343/5 AF |
| 3,573,826 | 4/1971 | Fredericks et al................. | 343/5 AF |

*Primary Examiner*—Malcolm F. Hubler
*Attorney, Agent, or Firm*—Cameron, Kerkam, Sutton, Stowell & Stowell

[57] ABSTRACT

A radar receiver for a frequency-agile radar system includes a variable frequency oscillator and an automatic frequency control operable to exert fine control over the frequency generated by the local oscillator. Control means are provided to derive from a number of previous values of the local ocillator frequency a control signal for application to the local oscillator to bring the generated frequency close to that required for fine correction by the automatic frequency control.

4 Claims, 3 Drawing Figures

RADAR RECEIVERS

THIS INVENTION relates to radar receivers, and in particular to receivers for use with frequency-agile radar systems.

Frequency-agile radar systems are systems in which the frequency of the transmitted pulse is varied from one pulse to the next. This is done to eliminate frequencysensitive returns which often cause false effects in a fixed-frequency system. The transmitter pulse frequency is varied in a more or less regular manner.

For the radar receiver to respond to radar return signals in respect of each transmitted pulse, the receiver local oscillator must also be controlled so as to track the transmitting oscillator with a constant frequency difference equal to the desired intermediate frequency. Conventional automatic frequency control (a.f.c.) circuits are only intended to operate over a relatively narrow frequency band to correct slight deviations in the output frequency of a local oscillator intended to operate at a constant frequency. The change in frequency occurring between successive transmitter pulses in a frequency-agile radar system is often too great for conventional a.f.c. techniques to be used.

It is an object of the invention to provide a radar receiver for use with a frequency-agile radar system in which the local oscillator of the receiver will track accurately the transmitter oscillator of the full working frequency range.

According to the present invention a radar receiver for a frequency-agile radar system includes a variable-frequency local oscillator, an automatic frequency control circuit operable to exert fine control over the frequency generated by the local oscillator, and control means operable to derive from a number of previous values of the local oscillator frequency a control signal the application of which to the local oscillator results in the generation of a signal of a frequency differing from that required by an amount within the correction range of the automatic frequency control circuit.

An embodiment of the invention will now be described with reference to the accompanying drawings, in which.

Figure 1:
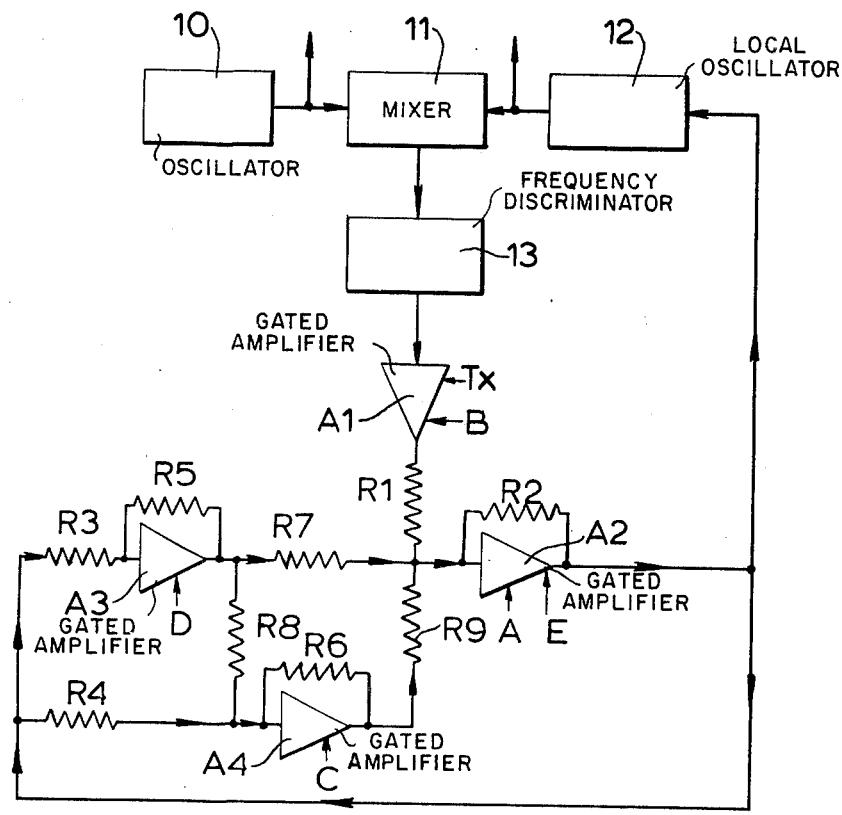
FIG. 1 is a block schematic diagram of part of the receiver.

Referring now to FIG. 1, the transmitting frequency-agile oscillator 10 is shown as supplying a signal to the a.f.c. mixer circuit 11, as does the receiver local oscillator 12. The two oscillators also supply signals to the receiver signal mixer circuit (not shown) and the transmitter oscillator supplies the necessary transmitter pulse. The mixer circuit 11 has its output connected to a frequency discriminator 13, the output of which is connected to the noninverting input of a gated storage amplifier A1. The gating inputs of amplifier A1 are a signal Tx representing the transmitter pulse, and a signal B the derivation of which will be described later.

The output of amplifier A1 is applied via a summing resistor R1 to the inverting input of a second gated storage amplifier A2. The gating pulses are denoted A and E. A feedback resistor R2 is connected across amplifier A2. The output of amplifier A2 is connected to the frequency control circuit of the receiver local oscillator 12 and, via resistors R3 and R4 to the inverting inputs of gated storage amplifiers A3 and A4, having feedback resistors R5 and R6 respectively. Amplifier A3 is gated by a pulse D, and amplifier A4 by a pulse C. The output of amplifier A3 is connected through a summing resistor R7 to the input of amplifier A2, and through a summing resistor R8 to the input of amplifier A4. The output of amplifier A4 is connected through a summing resistor R9 to the input of amplifier A2. Mixer 11, discriminator 13 and amplifiers A1 and A2 make up a conventional "instantaneous" a.f.c. circuit having a fairly small correction range of, say, a few MHz.

Figure 2:
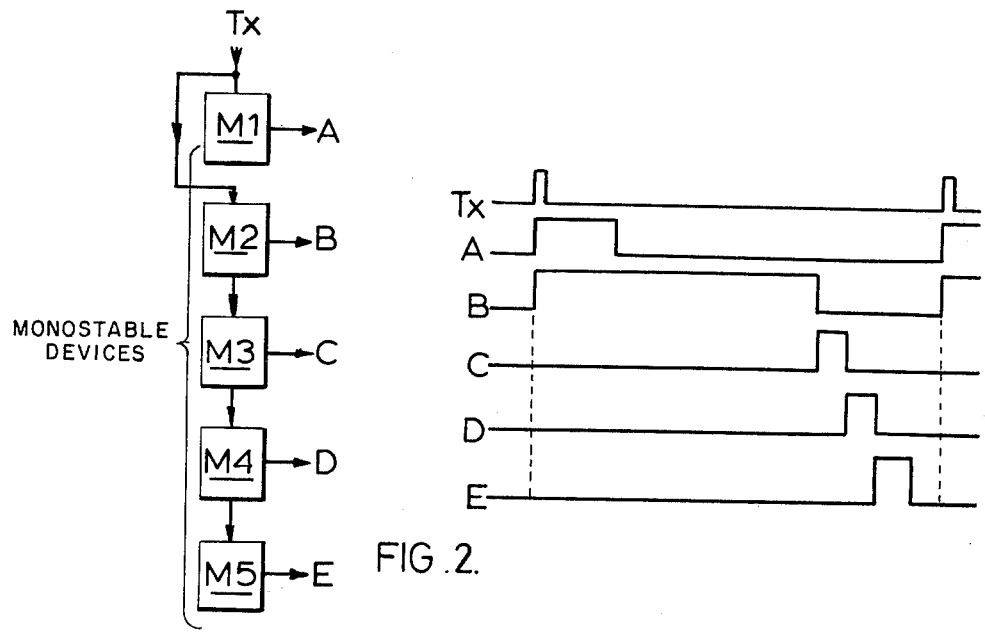
FIG. 2 shows the timing arrangements for the circuit of FIG. 1.

FIG. 2 shows the circuit of the timing means used to produce the various amplifier gating pulses, and the relative timing of these pulses. The circuit comprises five monostable circuits M1 to M5, each giving a delay of the required order. Monostable circuits M1 and M2 are each triggered by the transmitter signal Tx to give pulse A and B. Monostable circuits M3 and M5 are triggered in succession from M2. Pulse E occurs after all radar returns have been received. The interconnected gate storage amplifiers and the gating pulse generating circuit constitute the control means of the invention.

Figure 3:
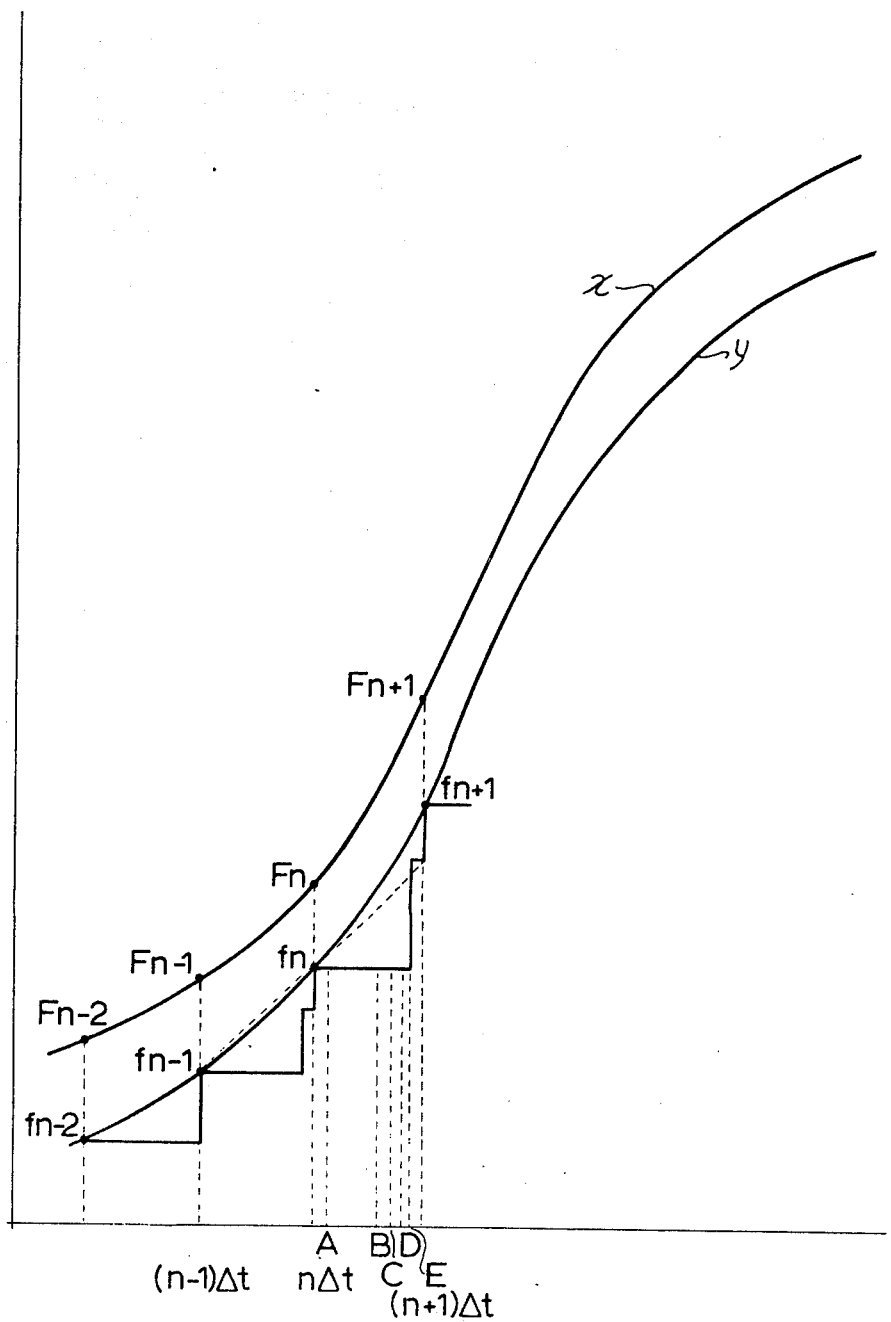
FIG. 3 illustrates the operation of the receiver.

The principle of operation is illustrated in FIG. 3. Curve X is part of the curve showing the variation of transmitter oscillator frequency with time, pulses being emitted at regular intervals $\Delta t$ at successive frequencies $F_{n-2}$, $F_{n-1}$, $F_n$, $F_{n+1}$ and so on. Curve Y is a curve having a constant frequency difference from curve X, the difference at any time being the required intermediate frequency. At the instant of transmission of the transmitter pulses the receiver local oscillator should be operating at the corresponding frequency $f_{n-2}$, $f_{n-1}$, $f_n$, $f_{n+1}$ and so on. In the interval between successive transmitter pulses the transmitter oscillator frequency will change, but that of the receiver local oscillator must remain constant to detect returns at the transmitted pulse frequency. Hence the frequency of the local oscillator should ideally vary in a stepwise manner, with corrections applied to bring the local oscillator to exactly the required frequency.

The gated storage amplifiers are able to preserve the output quantity at a previous value and change it only during the gating pulse. Hence for amplifier A1 the Tx gating pulse samples the output of the frequency discriminator and maintains an output V until the end of the gating pulse B, at which time it falls to zero. The outputs of the other amplifiers can change only when a gating pulse is applied.

The operation of the circuits of FIGS. 1 and 2 will now be described, with reference also to FIG. 3. It is assumed that the radar system has been operating for some time so that each of the amplifiers stores an output determined by previous cycles of operation.

At the start of the transmitter pulse the gating pulse Tx is applied to amplifier A1, followed almost immediately by a long gating pulse B developed by monostable circuit M2. The input to amplifier A1 is the d.c. output of the frequency discriminiator 13, sampled during the Tx gating pulse and representing any slight deviation of the difference frequency between the transmitting oscillator 10 and the receiver local oscillator 12 from the required intermediate frequency. The output of amplifier A1 thus represents a fine control voltage to be applied to the local oscillator 12 to correct for this deviation.

Amplifier A2 has as its inputs the outputs of amplifiers A1, A3 and A4, and combines these during the A gating pulse to form a final control output voltage $V_n$ which is applied to the local oscillator to bring it to the frequency necessary to detect received signals resulting from the transmitted pulse. The outputs of amplifiers A3 and A4 are determined by the inputs existing at the time of their respective D and C gating pulses in the previous cycle. If the control voltage applied to the local oscillator during the previous cycle was $V_{n-1}$, then this is the output of amplifier A3 during gating pulse A, and this is maintained until gating pulse D, later in the cycle.

When gating pulse B ends the output from amplifier A1 ceases, but that from amplifier A2 remains at $V_n$.

Gating pulse C causes a change in the output of amplifier A4. This has two inputs, currently $V_n$ from amplifier A2 and $V_{n-1}$ from amplifier A3. the output of amplifier A4 thus changes during gating pulse C to $(-V_n + V_{n-1})$. During gating pulse D the output of amplifier A3 is updated from $-V_{n-1}$ to $-V_n$.

The inputs to amplifier A2 are now $(-V_n + V_{n-1})$ from amplifier A4 and $-V_n$ from amplifier A3. During gating pulse E, almost at the end of the cycle, amplifier A2 sums these to give a new control voltage $V_{n+1}$ which is equal to $-((-V_n + V_{n-1}) - V_n)$.

Hence $V_{n+1} = 2 V_n - V_{n-1}$.

This is the new control voltage which is applied during gating pulse E to the local oscillator. This results in a rapid change in the local oscillator frequency to a value which is able to be corrected by the a.f.c. circuit. The final frequency correction occurs when the next transmitter pulse is produced, during gating pulse A of the next cycle, the output from the frequency discriminator at the beginning of the A gating pulse producing the final correction necessary. Thus the receiver local oscillator is correctly tuned by the time any returns are received.

This process is repeated for each successive transmitter pulse.

As already stated, the local oscillator frequency remains steady from the final correction at the beginning of the A gating pulse, before any returns are received, until the gating pulse E, after all returns have been received.

Due to the near-sinusoidal variation of transmitter oscillator frequency, the approximate correction applied by the above circuit is sometimes too small and sometimes too great. In all cases, however, the error is within the correction range of the a.f.c. circuit.

The embodiment described above is one in which only the value of local oscillator frequency produced in the immediately preceding pulse cycle is used and applied via storage amplifiers A3 and A4. It is however possible to use the local oscillator frequencies from more than one previous cycle. In such a case timing waveforms for the gated storage amplifiers would be spread over more than one pulse cycle, and a modified timing network would be necessary.

The gains of the various amplifiers have to be such that the necessary relationship exists between the various inputs to amplifier A2. The variation of local oscillator frequency with control voltage depends upon the nature of the oscillator. A backward-wave oscillator has a substantially linear relationship between frequency and helix voltage and may be easier to use than other types of oscillator.

What we claim is:

1. In a radar receiver for a frequency agile radar which includes a variable - frequency local oscillator and an automatic frequency control circuit responsive to a transmitted pulse to produce a fine control signal to exert fine control over the frequency generated by the local oscillator, the improvement of control means operable to produce a coarse control signal to exert coarse control over the frequency generated by the local oscillator, said control means comprising a first, a second and a third gated storage amplifier, means for connecting the output of the automatic frequency control circuit to the input of the third storage amplifier, means for applying a gate signal to said first storage amplifier such that said first amplifier is gated at such a time as to store the sum of the fine and coarse control signals produced in response to a previous transmitted pulse, means for connecting the output of the first gated storage amplifier to the input of said second gated amplifier, and to the input of said third gated amplifier, means for connecting the output of the second gated storage amplifier to the input of the third gated storage amplifier, means for applying a gate signal to said second storage amplifier such that said second amplifier is gated at such a time as to store the difference between the said sum of the fine and coarse control signals and the sum of the fine and coarse control signals produced in response to another previous transmitted pulse, the outputs of the first and second gated storage amplifiers forming the coarse control signal, means for gating said third storage amplifier and means for connecting outputs to an input of the automatic frequency control the output from said third gated storage amplifier to the input of said first and said second storage amplifiers and to the variable-frequency local oscillator to control the frequency of oscillation thereof.

2. A receiver as claimed in claim 1 wherein said means for applying a gate signal to said first, second and third gated amplifier includes timing means responsive to the transmitted pulse to generate a series of timing signals for application to the gated storage amplifier.

3. A receiver as claimed in claim 2 in which the timing means comprises a number of monostable devices, at least two of which are triggered directly in response to the transmitted pulse and the remainder of which are triggered in response to the output of one of said two monostable devices.

4. A receiver as claimed in claim 3 wherein said remainder of monostable devices are triggered in succession.

* * * * *

UNITED STATES PATENT OFFICE
CERTIFICATE OF CORRECTION

Patent No. 3,983,555      Dated September 28, 1976

Inventor(s) John Malcolm Morrison et al.

It is certified that error appears in the above-identified patent and that said Letters Patent are hereby corrected as shown below:

Claim 1, lines 40-41, "outputs to an input of the automatic frequency control" should be deleted.

Signed and Sealed this

Twenty-sixth Day of April 1977

[SEAL]

Attest:

RUTH C. MASON
*Attesting Officer*

C. MARSHALL DANN
*Commissioner of Patents and Trademarks*